United States Patent [19]

Nakata et al.

[11] Patent Number: 4,979,404
[45] Date of Patent: Dec. 25, 1990

[54] GEAR BACKLASH ADJUSTING MECHANISM

[75] Inventors: Masashi Nakata; Toshihiro Ishikawa, both of Kosai, Japan

[73] Assignee: Asmo Co., Ltd., Kosai, Japan

[21] Appl. No.: 412,462

[22] Filed: Sep. 26, 1989

Related U.S. Application Data

[63] Continuation-in-part of Ser. No. 210,369, Jun. 23, 1988, abandoned.

[30] Foreign Application Priority Data

Jun. 25, 1987 [JP] Japan ................................ 62-160567

[51] Int. Cl.⁵ ............................................. F16H 55/18
[52] U.S. Cl. ......................................... 74/409; 74/425
[58] Field of Search .................................. 74/409, 425

[56] References Cited

U.S. PATENT DOCUMENTS

| | | | |
|---|---|---|---|
| 1,181,384 | 5/1916 | Heaslit | 74/425 |
| 2,618,170 | 11/1952 | Mulcahy | 74/409 |
| 2,769,349 | 11/1956 | Castillo | 74/409 |
| 3,469,469 | 9/1969 | Burger | 74/409 |
| 3,583,253 | 6/1971 | Grimshaw et al. | 74/425 |
| 4,425,815 | 1/1984 | Norton et al. | 74/425 |
| 4,528,862 | 7/1985 | Goldowsky | 74/425 |
| 4,742,726 | 5/1988 | Adam et al. | 74/425 |

FOREIGN PATENT DOCUMENTS

| | | | |
|---|---|---|---|
| 2627645 | 2/1977 | Fed. Rep. of Germany | 74/425 |
| 243258 | 4/1926 | Italy | 74/425 |

*Primary Examiner*—Leslie A. Braun
*Assistant Examiner*—Scott Anchell
*Attorney, Agent, or Firm*—Burns, Doane, Swecker & Mathis

[57] ABSTRACT

A gear backlash adjusting mechanism includes a worm wheel having a gear tooth that engages the gear tooth of a worm. The gear tooth of the worm wheel is curved or tapered upwardly in the axial direction toward one end of the worm wheel. An adjusting apparatus permits the distance between the gear tooth of the worm wheel and the gear tooth of the worm to be adjusted so that the amount of backlash between the gear tooth of the worm wheel and the worm can be adjusted.

4 Claims, 5 Drawing Sheets

GEAR BACKLASH ADJUSTING MECHANISM

This is a continuation-in-part of U.S. Ser. No. 210,369, filed June 23, 1988, now abandoned.

BACKGROUND OF THE INVENTION

1. Field of the Invention

The present invention relates to a driving apparatus for use in a windshield wiper of a vehicle and more particularly, a driving apparatus including a gear backlash adjusting mechanism, for use in a worm gear reduction device.

2. Description of the Related Art

Conventionally, a worm gear reduction device as shown in FIG. 11 has been used as a windshield wiper of a vehicle. In the worm gear reduction, the amount of a backlash between a gear tooth of a worm 51 and a gear tooth of a worm wheel 52 is set to approximately 0.2~0.3 mm. If and when the backlash amount becomes greater than the above-described amount caused by an error which has occurred in assembling the worm gear reduction device or a dimensional error of the gear teeth of the worm wheel and/or the worm which has taken place when they have been manufactured, gear teeth of the worm and the worm wheel strike against each other caused by a load which fluctuates. Thus, a noise is generated. In order to prevent the occurrence of a backlash, countermeasures for increasing a gear-manufacturing accuracy have been made and a gear selection has been also made so that the gear of the worm and the gear of the worm wheel match with each other. However, it is expensive to manufacture gears with a high accuracy and the gear selection requires much time and is troublesome. In addition, it is not easy to assemble the worm gear reduction device.

SUMMARY OF THE INVENTION

Accordingly, an essential object of the present invention is to provide a driving apparatus for use in a windshield wiper of a vehicle including a gear backlash adjusting mechanism, for use in a worm gear reduction device, in which the configuration of a gear tooth is improved and an adjusting means for moving a worm wheel so that a backlash, which occurs in the contact area between the gear teeth of a worm and the worm wheel caused by an assembling error or a dimensional error, can be very easily adjusted.

In accomplishing this object, according to the present invention, there is provided a driving apparatus for use in a windshield wiper of a vehicle, which comprises a wiper motor having a motor shaft, a worm provided on the motor shaft, a worm wheel provided on an output shaft to be connected with a lever of a windshield wiper, the gear tooth of the worm wheel engaging the gear tooth of the worm, the gear tooth of the worm wheel being curved or tapered upwards toward one end of the gear tooth of the worm in the axial direction thereof, and an adjusting means for moving the worm wheel in the axial direction thereof so as to adjust the amount of the virtual contact area between the gear tooth of said worm and that of the worm wheel, whereby the amount of a backlash between the gear tooth of the worm and that of the worm wheel can be adjusted.

With the above arrangement of the present invention, the configuration of a gear tooth is improved and a backlash adjusting means are provided to adjust the amount of a backlash which occurs between gear teeth of a worm and a worm wheel by an easy operation after the worm and the worm wheel are assembled. Compared with the conventional method for adjusting a backlash by selecting the gear of the worm wheel so that it matches with the gear of the worm, the gear backlash adjusting mechanism according to the present invention easily accomplishes a backlash adjustment.

BRIEF DESCRIPTION OF THE DRAWINGS

The object and feature of the present invention will become apparent from the following description taken in conjunction with preferred embodiment thereof with reference to the accompanying drawings, in which.

DETAILED DESCRIPTION OF THE INVENTION

Figure 1:
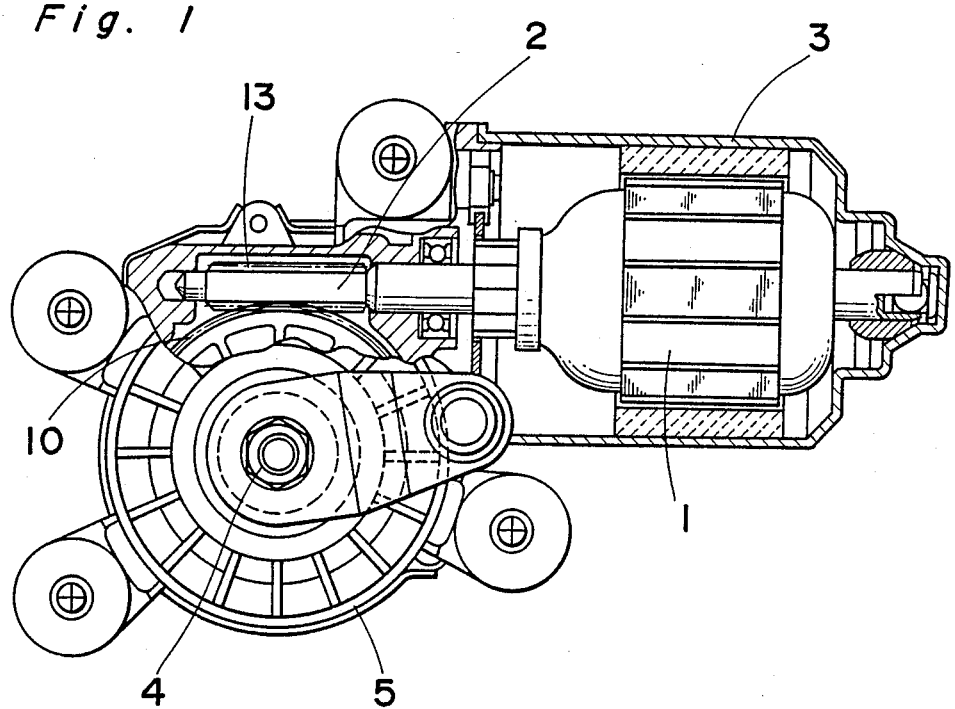
FIG. 1 is a front elevational view, partially cross-sectioned, of a driving apparatus for use in a windshield wiper of a vehicle in accordance with one preferred embodiment of the invention.

Before the description of the present invention proceeds, it is to be noted that like parts are designated by like reference numerals throughout the accompanying drawings.

Figure 2:
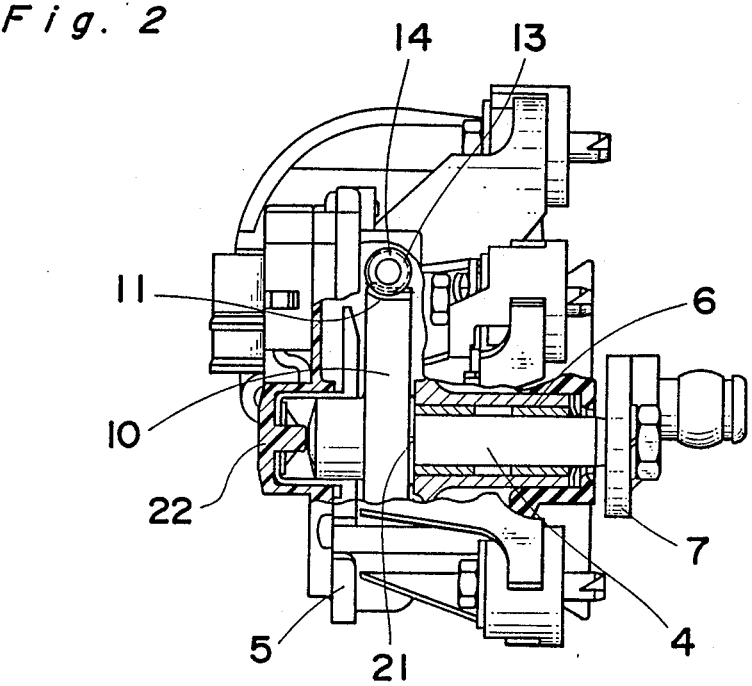
FIG. 2 is a side elevational view, partially cross-sectioned, of the driving apparatus of FIG. 1.

Referring now to FIGS. 1 and 2, there is shown a driving apparatus for use in a windshield wiper of a vehicle according to one embodiment of the present invention, comprising a wiper motor 1 having a motor shaft 2 and accommodated with a motor housing 3, a worm 13 provided on the motor shaft 2, a worm wheel 10 provided on an output shaft 4 which is rotatably provided within a gear casing 5 connected with the motor housing 3, the gear tooth 14 of the worm 13 being engaged with the tooth 11 of the worm wheel 10, the output shaft 4 being connected with a bearing 6 and a crank lever 7 of the windshield wiper, and an adjusting member for moving the worm wheel in the axial direction thereof, which is described later.

Figure 3:
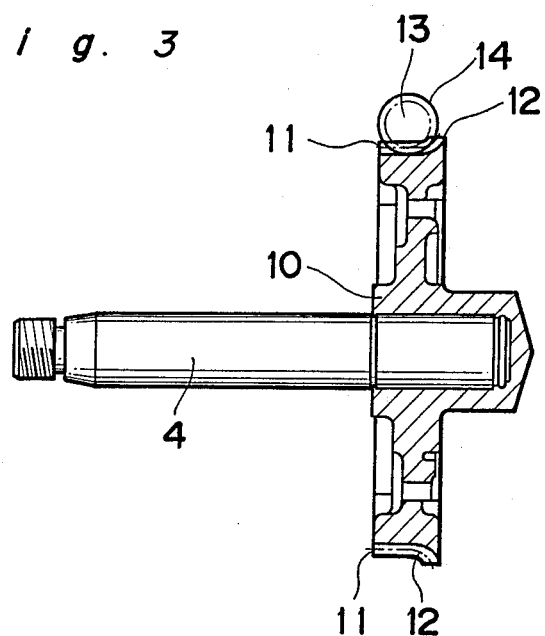
FIG. 3 is a cross-sectional view showing a worm and worm wheel the driving apparatus of FIG. 1.
Figure 4:
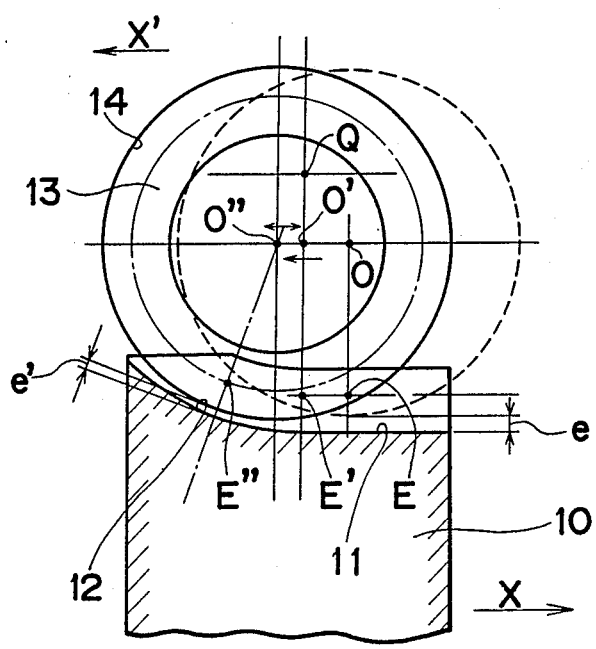
FIG. 4 is a cross-sectional view, on an enlarged scale, showing an engaging portion between the worm and worm wheel of FIG. 3.

As shown in FIGS. 3 and 4, the top surface of a gear tooth 11 of a worm wheel 10 in accordance with the present invention includes a curved portion 12 which extends upwards from substantially the middle portion toward one end in the axial direction thereof. The configuration of the curved portion 12 is formed when a hob cutter having the same radius as that of the circular arc of the curved portion 12 has cut a disk to a predetermined depth.

Figure 6:
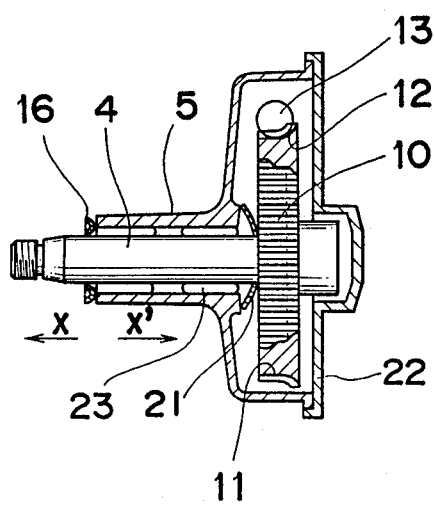
FIG. 6 is a cross-sectional view showing a backlash adjusting mechanism to be employed in the driving apparatus of FIG.1.

As shown in FIG. 6, the worm wheel 10 is mounted in a casing 5 by engaging the gear tooth 11 thereof with the gear tooth 14 of a worm 13 driven by the motor 1. The casing 5 is provided with a cover 22 to provide a space for accommodating the worm wheel 10 and worm 13 and a bearing for journaling the shaft 4 of the worm wheel 10. A backlash adjusting means comprises a teeth washer 16, and a disc spring 21 in association with the curved portion 12 of the gear tooth 11 of worm wheel 10, which is provided to allow the worm wheel 10 to be slidable through the casing 5 in the axial direction thereof (directions shown by arrows x, x' in FIG. 6).

According to the present invention, the gear tooth 11 of the worm wheel 10 includes the curved portion 12, and the worm wheel 10 is mounted in the casing 5 so as to be slidable through the casing 5 in the axial direction thereof. Owing to this construction, a backlash, which takes place between the gear tooth 11 of the worm wheel 10 and the gear tooth 14 of the worm 13 caused by an inappropriate assembling and a dimensional error of the gear teeth, can be adjusted.

Figure 5A:
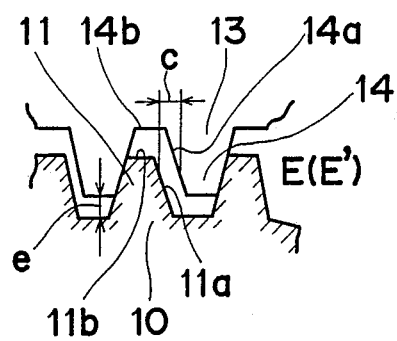
FIG. 5(a) and FIG. 5(b), are schematic view, on an enlarged scale, showing a backlash adjusting operation between the gear tooth of the worm and the gear tooth of the worm wheel of FIG. 4.
Figure 5B:
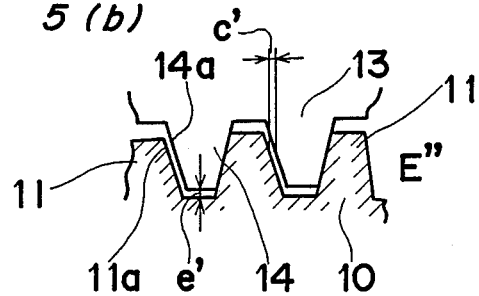

The principle of adjusting a backlash in accordance with the present invention is described with reference to FIGS. 5(a) and 5(b) hereinbelow. Before a backlash adjustment is effected, the relationship between the gear tooth 11 of the worm wheel 10 and the gear tooth 14 of the worm 13 is as shown in FIG. 5(a). Let it be assumed that the backlash amount between the side faces of gear teeth 11 and 14 is shown with (C). The backlash amount (C) is reduced by moving the curved portion 12 of the worm wheel 10 in the axial direction thereof (direction shown by (X) in FIGS. 4 and 6) so that the curved portion 12 of the worm wheel 10 engages with the gear tooth 14 of the worm 13. As shown in FIG. 4, with the movement of the worm wheel 10, the center of the worm 13 with respect to the worm wheel 10 shifts from a point O to a point O', and then, from the point O' to a point O'', and the virtual engagement point between the gear tooth 11 and the gear tooth 14 shifts from a point E to E', and then, from the point E' to a point E''. The backlash amount (C) starts to be reduced from the time when the center of the worm 13 is positioned at the point O' which is immediately below the center Q of the curved portion 12 of the worm wheel 10. This is because the distance between the top surface of the gear tooth 14 of the worm 13 and the curved portion 12 of the worm wheel 10 decreases as the virtual engagement point shifts from the point (E') to the point (E''). At the point (E''), the distance between the gear tooth of the worm 13 and the gear tooth of the worm wheel 10 is minimum. Thus, the backlash amount is reduced from (C) shown in FIG. 5(a) to a small amount of (C') shown in FIG. 5(b). The gap between the top surface 11b of the gear tooth 11 and the top surface 14b of the gear tooth 14 is reduced from (e) shown in FIG. 5 (a) to (e') shown in FIG. 5(b) in proportion to the reduction of the distance between the gear tooth 14 and the gear tooth 11. In consideration of this, the distance between the top surfaces thereof is initially set to be great.

Based on the above-described principle for adjusting a backlash amount, the virtual contact point between the gear teeth 11 and 14 is set initially to the curved portion 12 before a backlash adjustment is performed, and the worm wheel 10 is adjusted to slide in the X direction. Thus, the backlash amount can be adjusted.

The mechanism for moving the worm wheel 10 in the axial direction thereof is described hereinbelow. As shown in FIG. 6, first, the worm wheel 10 slides in the axial direction thereof (direction shown by (X) in FIGS. 4 and 6), and the virtual engagement point of the gear tooth 11 of the worm wheel 10 and the gear tooth 14 of the worm 13 is set at a position at which the reduction of the backlash amount is obtained. Thereafter, the teeth washer 16 is mounted fixedly on the shaft 4 of the worm wheel 10 as a stopper to the casing 5 so that the worm wheel 10 can slide together with the shaft 4 against the casing 5 only in the axial direction thereof (X direction). In other words, the teeth washer 16 is provided to keep the minimum distance e' between the gear tooth of the worm 13 and the gear tooth of the worm wheel 10 in order to prevent the worm wheel 10 from moving beyond the point E'' of FIG. 4 toward the worm 13 in the axial direction of X'. In the transmission of wiper motor in vehicle, the minimum distance e' is generally set up in a small dimension of about less then 0.1 mm. This mechanism is constructed easily and at a low cost.

Figure 7:
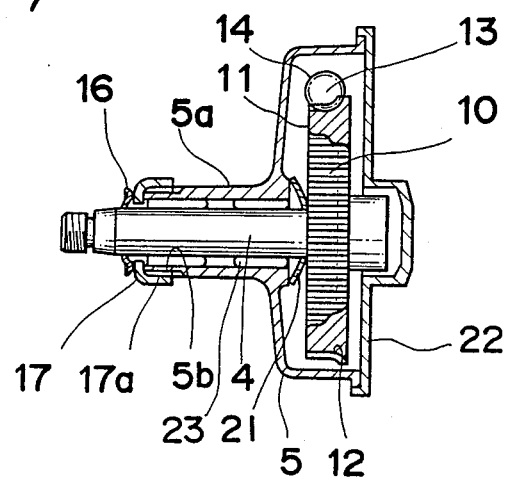
FIG. 7 is a similar view of FIG. 6, but showing a modification of the backlash adjusting mechanism.
Figure 8:
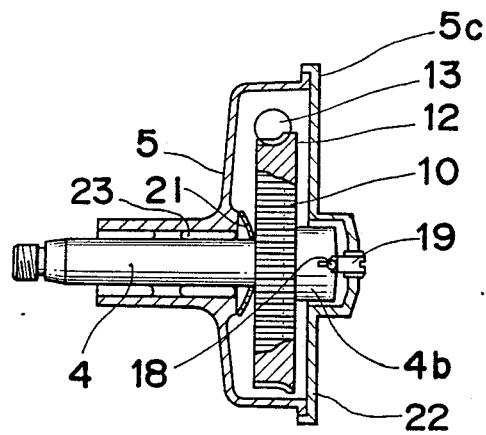
FIG. 8(a) and FIG. 8(b), are similar view of FIG. 6, but showing another modification of the backlash adjusting mechanism.
Figure 8:
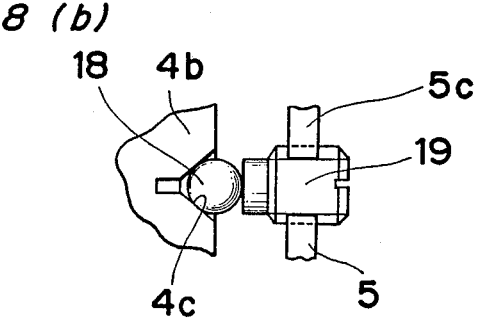

The constructions shown in FIGS. 7 and 8 are also preferred as backlash adjusting mechanisms for moving and stopping the worm wheel 10 at the most appropriate position in the axial direction thereof.

In the embodiment shown in FIG. 7, a male screw 5b is mounted on the top end of a worm wheel shaft cover 5a of the casing 5, and the shaft 4 of the worm wheel 10 slides in the axial direction thereof through a thrust adjusting screw 17 on which a female screw 17a which engages with the male screw 5b is mounted. The teeth washer 16 is mounted on the shaft 4 of the worm wheel 10 at a certain position thereof. The thrust adjusting screw 17 is rotated to be moved along the circumference of the casing 5. Since the teeth washer 16 is supported by the thrust adjusting screw 17, the worm wheel 10 slides in the casing 5 and with respect to the worm 13 in the axial direction thereof.

In the embodiment shown in FIGS. 8(a) and 8(b), a steel ball 18 is fitted in a concave 10c formed in the end face 4b of the shaft 4a of the worm wheel 10, and an adjusting screw 19 which contacts with the steel ball 18 is mounted on the cover plate 5c of the casing 5. The worm wheel 10 is moved in the axial direction thereof by rotating the adjusting screw 19 so as to adjust the backlash amount.

A known mechanism may be selected to move the worm wheel 10 in the axial direction thereof, and then, stop it at an appropriate position in the axial direction thereof so that a backlash amount may be adjusted. Instead of moving the worm wheel 10 in the axial direction thereof, the backlash amount can be also adjusted by moving the worm 13 in the radial direction thereof (direction (X') shown in FIG. 4).

Figure 9:
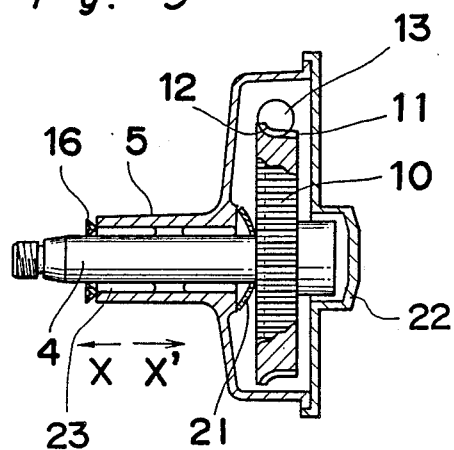
FIG. 9 is a similar view of FIG. 6, but showing a modification of the engaging portion between the worm and worm wheel.
Figure 10:
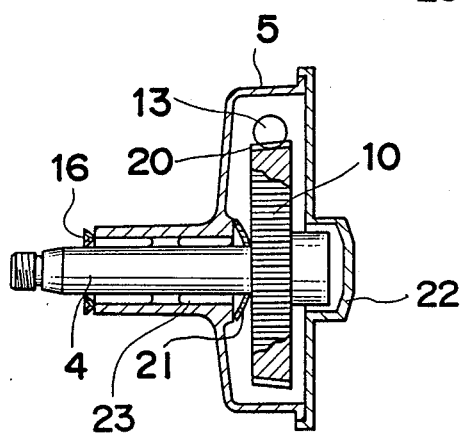
FIG. 10 is a similar view of FIG. 6, but showing another modification of the engaging portion between the worm and worm wheel.
Figure 11:
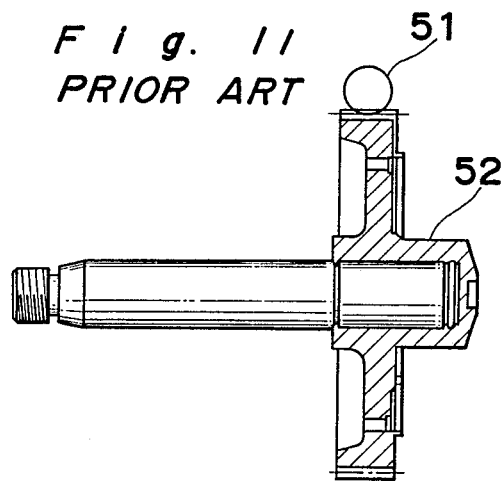
FIG. 11 is a cross-sectional view showing a conventional engagement between a worm and a worm wheel employed in the driving apparatus, as already referred above.

As shown in FIG. 9, the curved portion 12 may be formed toward the opposite end of the gear tooth 11 (the curved portion 12 is formed on one end of the top surface of the gear tooth 11 in the embodiment shown in FIG. 3), namely, curved upwardly toward the opposite side of the worm wheel 10. In this case, the backlash amount can be reduced by moving the worm wheel 10 in the opposite direction (direction X'). Further, as shown in FIG. 10, instead of curving the top surface of the gear tooth 11 of the worm wheel 10, a tapered portion 20 may be formed on the top surface of the gear tooth 11 in the axial direction thereof. Similarly to the curved configuration, a backlash amount can be also reduced by adjusting the virtual contact area between the gear tooth 14 of the worm 13 and the gear tooth 11 of the worm wheel 10 when the worm wheel 10 slides in the axial direction thereof.

As can be seen from FIGS. 2, 4, 6, 7, 8(a), 9 and 10, the initially coned disc spring or belleville spring 21 is positioned on the output shaft 4 between the gear casing 5 and the worm wheel 10.

The disc spring 21 is cone-shaped or disc-shaped and has skirts of a curved, tapered cross-section and an opening of round shape at its vertex so as to be able to compress in its axial direction between the outer edge of the skirts and the upper edge of the opening to generate a urging force therebetween. The output shaft 4 is loosely passed through the opening of the disc spring 21, of which the outer edge of the skirts contacts the inner surface of the gear casing 5, while the upper edge of the opening of the disk spring contacts the side surface of the worm wheel 10. The disc spring 21 presses the worm wheel 10 towards the cover 22 of casing 5 in the axial direction represented by the letter X' in FIGS. 4 and 6.

To assemble the adjusting mechanism, the disc spring 21 is firstly placed between the gear casing 5 and the worm wheel 10 after inserting the output shaft 4 into the opening of the disc spring 21, the output shaft 4 journaled on the bearing is secondly drawn out in the axial direction X by applying a pushing force thereon from the outside in a known manner, under pressing the disc spring 21 until the minimum distance e' to be disposed at the point E of FIG. 4 is established between the gear tooth of the worm 13 and the gear tooth of the worm wheel 10, and the teeth washer 16 is finally mounted fixedly on the output shaft 4 under fitting the one side of the teeth washer 16 with the side surface of the gear casing for keeping the disc spring in pressing between the gear casing 5 and the worm wheel 10.

By the urging force of the disc spring, the worm wheel 10 is rendered to move over the worm 13 from the point E to the point E" of FIG. 4 with respect to the FIG. 9 embodiment, or from the point E" to the point E of FIG. 4 with respect to the other embodiments at which it is stopped by the teeth washer 16 or the adjustable screw 19. Thus, the disc spring 21 tends to force the worm wheel 10 in a direction opposite to the direction in which the teeth washer 16 (FIGS. 6 and 7) and the adjustable screw 19 (FIGS. 8(a) and 8(b)) are provided to prevent the worm wheel 10 from moving at a certain point in the axial direction X. It can be readily understood that the force applied by the teeth washer 16 or the adjustable screw 19 tends to stop the worm wheel 10 at a certain point in the axial direction X and is larger than the force exerted by the disc spring 21 that tends to urge the worm wheel 10 in the opposite axial direction X'. Hence, while the teeth washer 16 or the adjustable screw 19 serves to prevent movement of the worm wheel 10 in the axial direction X' while at the same time permitting movement of the worm wheel 10 in the axial direction X, the disc spring 21 tends to reduce the ability of the worm wheel 10 to move in the axial direction X. In that way, the combination of the disc spring 21 and the teeth washer 16 or the adjustable screw 19 tends to maintain the position of the worm wheel 10 relative to the casting 5.

Accordingly, the worm wheel 10 is always pressed by the disk spring 21 in the axial direction X', at which the teeth washer 16 is operated as a stopper to prevent the worm wheel 10 from moving beyond the point E of FIG. 4, and can be occasionally moved back against the force of disc spring 21 in the axial direction X for adjusting the condition of transmission between the worm wheel 10 and worm 13.

As apparent from the foregoing description, according to the present invention, the top surface of gear tooth of the worm wheel which engages with the gear of the worm is curved or tapered upwards toward one side thereof in the axial direction, and adjusting mechanisms for sliding the worm wheel having the above-described configuration in the axial direction thereof and allowing the worm wheel to slide in the axial direction thereof in an appropriate range in the casing. Therefore, the backlash which occurs in the virtual contact area between the gear tooth of the worm wheel and the gear tooth of the worm can be easily adjusted by adjusting the thrust applied to the worm wheel. Accordingly, when a backlash occurs due to an error in assembling a worm gear reduction device or a dimensional error of the gear teeth of the worm and/or worm wheel, a backlash amount can be reduced by a very easy operation after they are assembled. Owing to such a construction, it is unnecessary to select a worm wheel gear so that it matches the worm gear, that is, it is easy to construct the gear backlash adjusting mechanism. Furthermore, owing to the construction described above, the gear backlash adjusting mechanism accomplishes a backlash adjustment even though the dimensions of the casing and the worm wheel are not manufactured with a high accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A driving apparatus for use in a windshield wiper of a vehicle, comprising;
    a wiper motor having a motor shaft;
    a worm provided on the motor shaft, said worm having a gear tooth on its outer periphery;
    a worm wheel provided on an output shaft and adapted to be connected to a lever of a windshield wiper, said worm wheel having a gear tooth that engages with the gear tooth of the worm over a virtual contact area, the gear tooth of the worm wheel being curved or tapered radially outwards toward one end of the gear tooth of the worm wheel in an axial direction thereof;
    a gear casing for accommodating the worm and worm wheel therein and supporting rotatably the motor shaft and the output shaft which is slidably supported so that one end of the output shaft extends outside the gear casing; and
    an adjusting means including an initially coned disk spring disposed between the gear casing and the worm wheel with the output shaft of the worm wheel extending through an opening of the disk spring for providing a force that urges the worm wheel in a first direction and a stopper means for providing a force in opposition to the force of the disk spring in order to set the position of the worm wheel relative to the worm whereby a distance between the gear tooth of the worm and the gear tooth of the worm wheel can be adjusted.

2. The driving apparatus as defined in claim 1, wherein said stopper means comprises a teeth washer provided fixedly on the end of the output shaft projected out from the gear casing.

3. The driving apparatus as defined in claim 1, wherein said stopper means comprises an adjustable screw provided on the gear casing to contact with the output shaft.

4. The driving apparatus as defined in claim 1, wherein said disk spring is cone-shaped having skirts of a curved cross-section and a round opening at its vertex, said disk spring being positioned such that an outer edge of the skirts contacts an inner surface of the gear casing and an upper edge of the opening contacts a side surface of the worm wheel.

* * * * *